(12) United States Patent
Wang et al.

(10) Patent No.: US 10,417,193 B2
(45) Date of Patent: Sep. 17, 2019

(54) DISTRIBUTED FILE SYSTEM CONSISTENCY CHECK

(71) Applicant: VMware, Inc., Palo Alto, CA (US)

(72) Inventors: Wenguang Wang, Santa Clara, CA (US); Yunshan Lu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 771 days.

(21) Appl. No.: 15/163,471

(22) Filed: May 24, 2016

(65) Prior Publication Data
US 2017/0344597 A1    Nov. 30, 2017

(51) Int. Cl.
*G06F 16/182* (2019.01)

(52) U.S. Cl.
CPC .......... *G06F 16/182* (2019.01); *G06F 16/184* (2019.01)

(58) Field of Classification Search
USPC ....................................................... 707/690
See application file for complete search history.

(56) References Cited

U.S. PATENT DOCUMENTS

| | | | | |
|---|---|---|---|---|
| 7,546,319 | B1 * | 6/2009 | Srinivasan | G06F 16/134 |
| 7,653,699 | B1 * | 1/2010 | Colgrove | G06F 16/10 |
| | | | | 709/213 |
| 7,752,492 | B1 * | 7/2010 | Armangau | G06F 11/1435 |
| | | | | 714/42 |
| 7,925,630 | B1 * | 4/2011 | Krishnamurthy ... | G06F 11/1471 |
| | | | | 707/649 |
| 8,417,987 | B1 * | 4/2013 | Goel | G06F 11/1076 |
| | | | | 714/6.1 |
| 2006/0282471 | A1 * | 12/2006 | Mark | G06F 16/128 |
| 2007/0073781 | A1 * | 3/2007 | Adkins | G06F 11/1435 |
| 2009/0089628 | A1 * | 4/2009 | Day | G06F 11/0727 |
| | | | | 714/54 |
| 2014/0173226 | A1 * | 6/2014 | Gold | G06F 3/06 |
| | | | | 711/159 |
| 2017/0270144 | A1 * | 9/2017 | Iyer | G06F 16/184 |

\* cited by examiner

*Primary Examiner* — Cam Linh T Nguyen
(74) *Attorney, Agent, or Firm* — Fish & Richardson P.C.

(57) ABSTRACT

Exemplary methods, apparatuses, and systems include a controller node receiving a request to perform a consistency check of a distributed file system. The controller node transmits, to each of a plurality of nodes, a request for the node to use logical metadata of the distributed file system owned by the node to construct an expected copy of physical metadata mapped to the logical metadata, determine which of the plurality of nodes own actual portions of the physical metadata, transmit corresponding portions of the expected copy of the physical metadata to each of the nodes determined to own actual portions of the physical metadata, and compare expected copies of the physical metadata received from other nodes to the actual physical metadata owned by the node. The controller node receives a result of the comparison from each of the nodes, aggregates the received results, and generates an error report.

20 Claims, 4 Drawing Sheets

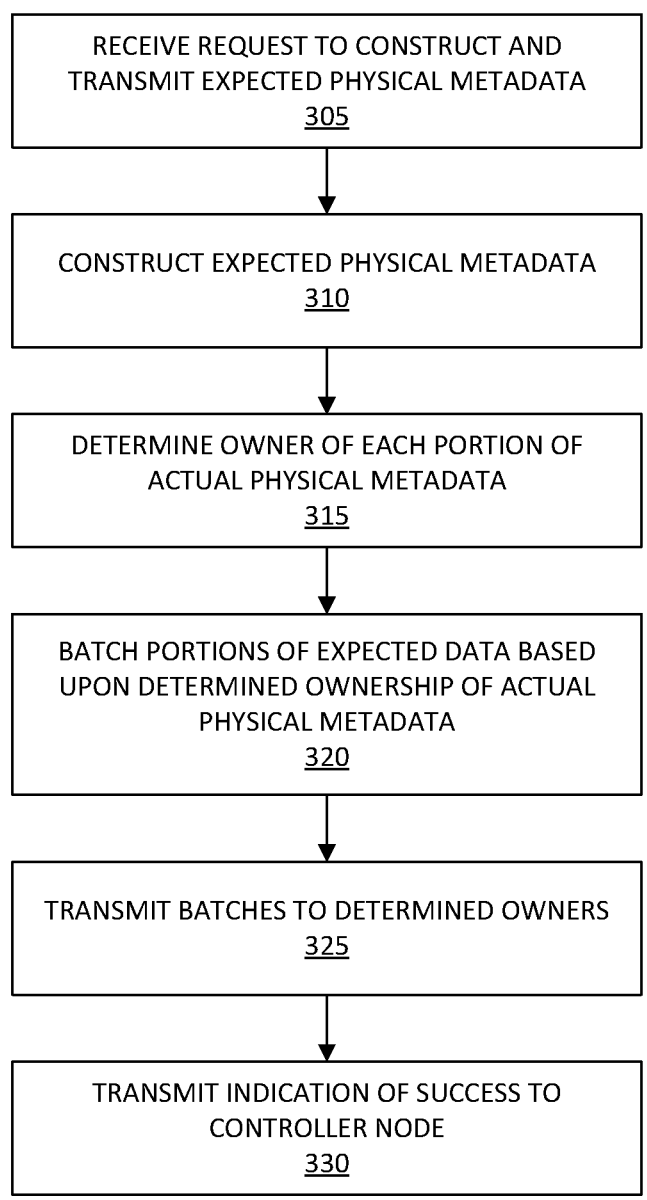

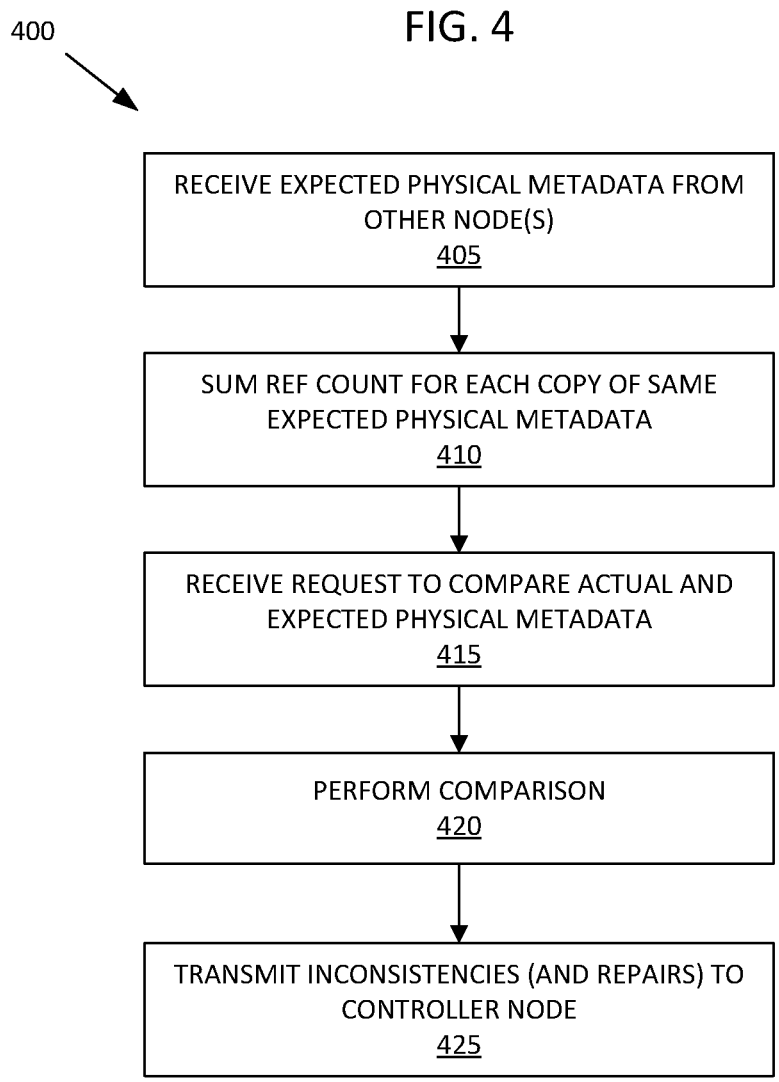

DISTRIBUTED FILE SYSTEM CONSISTENCY CHECK

FIELD OF THE INVENTION

The various embodiments described in this document relate to checking the consistency of a distributed file system. In particular, embodiments relate to each of multiple nodes within a distributed file system concurrently performing a portion of the consistency check.

BACKGROUND OF THE INVENTION

A file system consistency check tool (such as "fsck") is an important utility for maintaining a file system. In checking file system consistency, the tool compares logical file system metadata with physical file system metadata and reports and/or repairs inconsistencies. Logical and physical metadata may include a logical pathname or address, an offset and/or data length, a physical address, a reference count (e.g., the number of logical paths to the same physical address), a bitmap or other data structure tracking usage of physical storage addresses, a checksum, etc. Potential inconsistencies include, for example, 1) a logical address pointing to or otherwise mapping to a physical address marked as free space, 2) a physical address storing data without a corresponding logical address mapping to the physical address, and 3) a reference count that is greater or less than the number of logical addresses mapped to the corresponding physical address.

To compare logical file system metadata with physical file system metadata, a file system consistency check tool reads and uses logical file system metadata to build, in memory, the expected set of physical file system metadata (e.g., bitmap, reference count, etc.) that would correspond to the logical file system metadata. The tool compares the expected set of physical file system metadata with the actual set of physical file system metadata and reports and/or corrects inconsistencies. A file system distributed across multiple nodes, however, is likely to result in an expected set of physical file system metadata that is too large to fit within the memory of a single node. Additionally, a single node checking the consistency of a distributed file system would be an inefficient use of resources.

BRIEF DESCRIPTION OF THE DRAWINGS

The present invention is illustrated by way of example and not limitation in the figures of the accompanying drawings, in which like references indicate similar elements, and in which:

FIG. 3 is a flow chart illustrating an exemplary method of a node contributing to a first portion of a distributed file system consistency check; and FIG. 4 is a flow chart illustrating an exemplary method of a node contributing to a second portion of a distributed file system consistency check.

DETAILED DESCRIPTION

This document describes embodiments that implement a consistency check within a distributed file system. In particular, embodiments are directed to controller node orchestrating the consistency check by having each of a plurality of nodes use logical metadata owned by the node to construct an expected copy of physical metadata mapped to the logical metadata, determine which of the plurality of nodes own actual portions of the physical metadata, transmit corresponding portions of the expected copy of the physical metadata to each of the nodes determined to own actual portions of the physical metadata, and compare expected copies of the physical metadata received from other nodes to the actual physical metadata owned by the node. The controller node receives a result of the comparison from each of the nodes, aggregates the received results, and generates an error report. Additionally, the controller node monitors the progress of the distributed consistency check and updates the delegation of portions of the consistency check in response to failures or changes in ownership of metadata. As a result, the task of performing the consistency check, and the corresponding use of memory and processing resources, is efficiently distributed across multiple nodes that implement the distributed file system.

Figure 1:
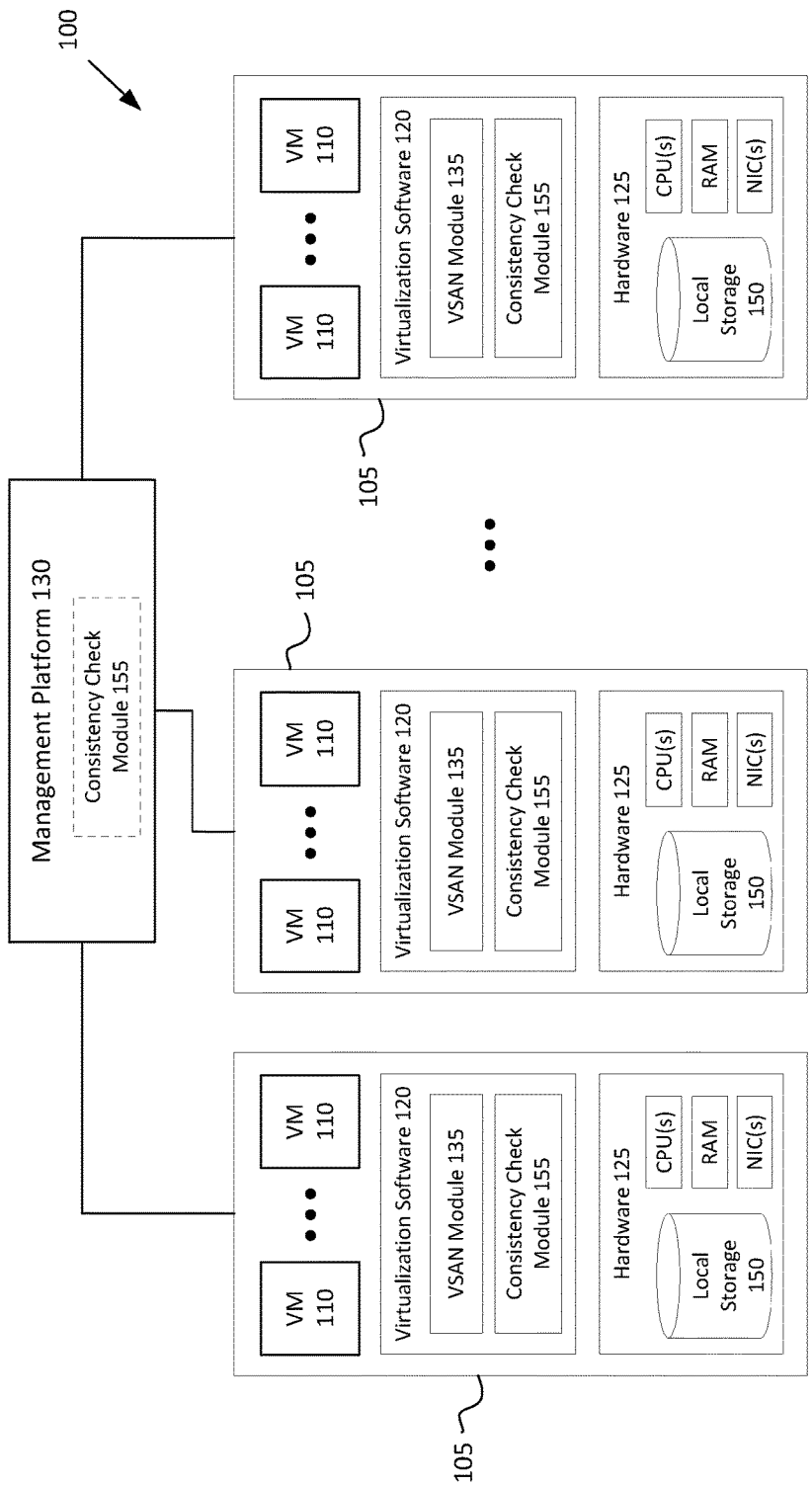
FIG. 1 illustrates, in block diagram form, an exemplary virtual data center environment including one or more networked processing devices implementing a distributed file system consistency check.

FIG. 1 illustrates, in block diagram form, exemplary computing environment 100, including one or more networked nodes 105 to implement a distributed file system consistency check. Nodes 105 may also be referred to within this document as physical computers, hosts, and/or servers. In one embodiment, server-based computing in computing environment 100 provides centrally-managed user virtual desktops, such as those implemented by virtual machines (VMs) 110, via one or more networks (e.g., a local area network or other private or publically accessible wide area network, such as the Internet). For example, a client device and a VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by the VM 110. In one embodiment, one or more VMs 110 implement a virtualized computer, networking, storage, or security service (e.g., a firewall, webserver, database server, etc.). In one embodiment, computing environment 100 provides segregated server-based computing environments for multiple datacenter tenants. A datacenter tenant refers to a group of users that share common access with specific privileges. For example, the group of users may have common access to stored data objects, applications, etc. that users of another tenant may not access.

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic disk drives, optical disk drives, etc. The memory may be internal or distributed memory.

One or more buses may be used to interconnect the various components of hardware 125. Additionally, the network interface controllers may be used to connect nodes 105, via a wired or wireless network, with one another.

Virtualization software layer 120 runs on hardware 125 of node 105. Virtualization software layer 120 manages VMs 110 and physical resources, such as hardware 125. Additionally, virtualization software layer 120 maintains virtualto-physical hardware mappings. For example, virtualization software 120 may manage VM access to a processor, memory, or a network interface within hardware 125. Additionally, virtualization software 120 may manage access to virtual disks (or portions thereof) and other related files within local storage 150 that may be accessed by VMs 110 residing in one or more nodes 105.

Management platform 130 is associated with nodes 105. Management platform 130 enables an administrator to manage the configuration of computing environment 100. In one embodiment, management platform 130 provides a management console for manual and automated control of nodes 105, VMs 110, and hardware 125. For example, management platform 130 may provision, configure, and maintain VMs 110 as virtual desktops or network services, manage pools of computer resources to run VMs 110, etc. In one embodiment, an administrator sets and/or defines storage policies using management platform 130.

Local storage 150 housed in or otherwise directly attached to nodes 105 may include combinations of solid-state drives (SSDs) and/or magnetic or spinning disks (MDs). As used in this document, the term "housed" or "housed in" may be used to encompass both housed in or otherwise directly attached storage. In certain embodiments, SSDs serve as a read cache and/or write buffer in front of magnetic disks to increase I/O performance.

Each node 105 includes storage management or VSAN module 135 to automate storage management workflows and provide access to objects. Each VSAN module 135 (e.g., through an object management layer or submodule) communicates with other VSAN modules 135 of other nodes 105 to create and maintain a directory service or an in-memory metadata database (e.g., maintained separately but in synchronized fashion in the memory of each node 105) that contains metadata describing the locations, configurations, policies, and relationships among the various objects stored in an object store. This in-memory metadata database is utilized by a VSAN module 135 on a node 105, for example, when an administrator first creates a virtual disk for a VM 110 as well as when the VM 110 is running and performing I/O operations (e.g., read or write) on the virtual disk. VSAN module 135 traverses a hierarchy of objects using the metadata in the in-memory database in order to properly route an I/O operation request to the node (or nodes) 105 that houses (house) the actual physical local storage that backs the portion of the virtual disk that is subject to the I/O operation.

Nodes 105 include consistency check module 155. Consistency check modules 155 implement distributed file system consistency checks as described with reference to FIGS. 2-4. For example, consistency check module 155 enables a node 105 to serve as the controller node and manage the distributed file system consistency check as described with reference to FIG. 2. In one embodiment, management platform 130 optionally includes a controller version of consistency check module 155. Additionally, consistency check module 155 enables other nodes 105 to each contribute to first and second portions of the distributed file system consistency check as described with reference to FIGS. 3-4.

While described with reference to computing environment 100, consistency check module 155 may also be implemented in other computing environments. For example, consistency check module 155 may implement the distributed file system consistency check described within this document in a server, computer, or other computing environment that does not include virtual machines.

Figure 2:
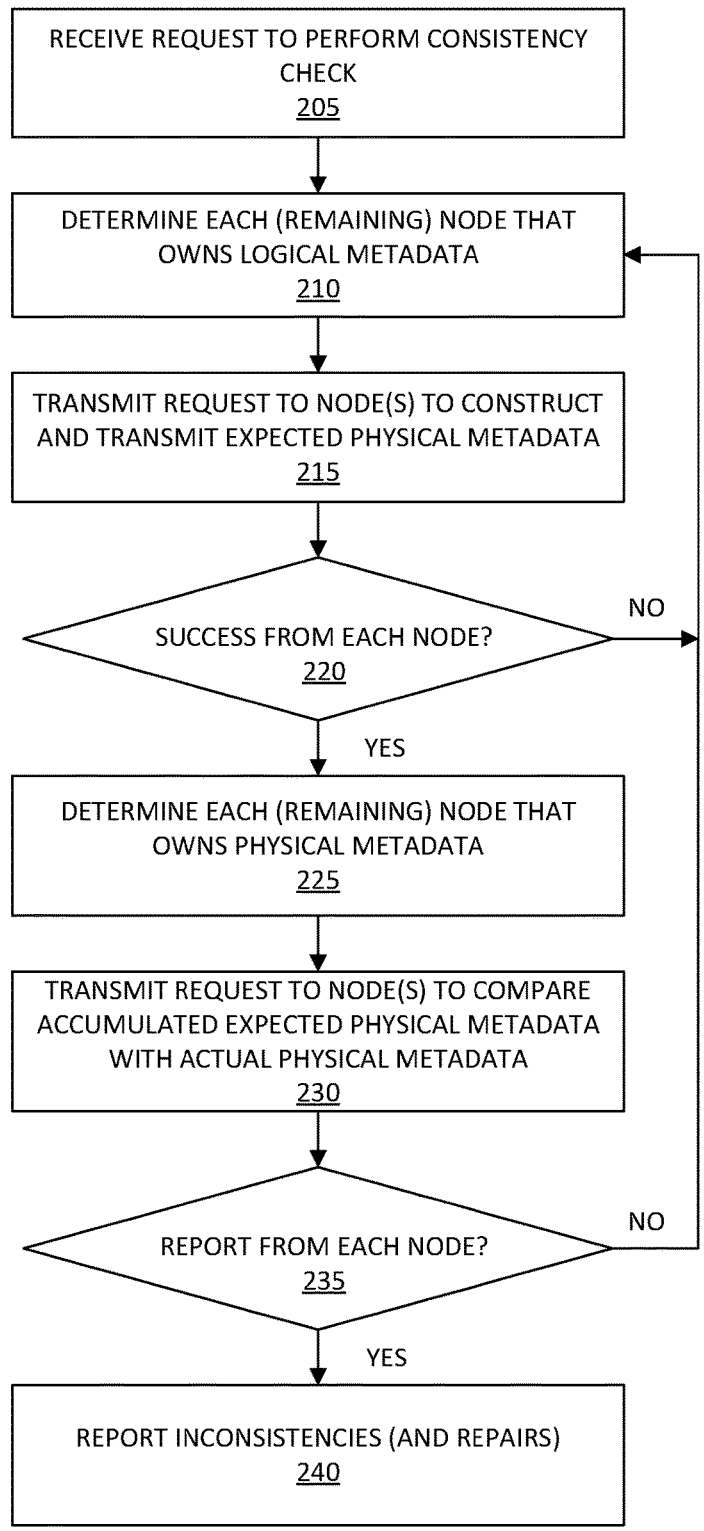
FIG. 2 is a flow chart illustrating an exemplary method of a controller node managing a distributed file system consistency check.

FIG. 2 is a flow chart illustrating an exemplary method 200 of a controller node managing a distributed file system consistency check. At block 205, the controller node receives a request to perform a consistency check for the distributed file system. For example, an administrator may submit a request via a VM 110 or another interface to consistency check module 155 within a node 105 or, alternatively within management platform 130. In another embodiment, management platform 130 or virtualization software 120 initiates the request as a part of automated maintenance.

At block 210, the controller node determines each node that is included within the implementation of the distributed file system and owns logical metadata of the distributed file system. For example, each node 105 (or VM 110 running on node 105) may have logical addresses, pointers, or other paths to data stored across storage 150 of multiple nodes 105. These logical paths are resolved by node 105 to direct requests to the corresponding storage 150 storing the data. In one embodiment, each VSAN module 135 communicates with other VSAN modules 135 of other nodes 105 to create and maintain a directory service or another in-memory metadata database that contains metadata describing which nodes 105 own logical metadata of the distributed file system. In such an embodiment, consistency check module 155 passes a request to VSAN module 135 for a listing of nodes 105 owning the logical metadata as represented by the directory service.

At block 215, controller node transmits a request to each node determined to own logical metadata. The request causes each node to construct the expected physical metadata based upon the node's logical metadata. For example, each node 105 builds in its memory (or a temporary area of disk) a bitmap, reference count, and/or physical address space storing data referenced by the logical metadata.

The request further causes each node to transmit expected physical metadata to the corresponding nodes that own the actual physical metadata. For example, within each node 105, consistency check module 155 submits a request to the directory service managed by VSAN module 135 to determine which nodes 105 own the actual physical metadata, such as the physical storage addresses mapped to the logical metadata. Using the directory service data, consistency check module 155 batches the expected physical metadata according to corresponding owners of the actual physical metadata. Node 105 transmits the batches to the determined owners. The owners of the physical metadata store the expected physical metadata in memory or a temporary area on disk. In one embodiment, multiple batches of expected physical metadata are accumulated to the temporary area on disk based on the address of the physical metadata. In one embodiment, node 105 may own a portion of actual physical metadata and retain the corresponding batch of expected physical metadata.

At block 220, the controller node determines if an indication of success has been received from each node. For example, upon successfully building the expected physical metadata and transmitting the corresponding batches, each node transmits an indication of success to the controller node. In one embodiment, the controller node uses a threshold period of time to wait for indications of success and the lack of receipt of an indication of success within the threshold period of time is treated as a failure.

If the controller node has not received an indication from another node, method 200 returns to block 210 and the controller node determines if a new node is now the owner of the corresponding logical metadata. Upon receiving an indication of success from all nodes, at block 225, the controller node determines each node that owns physical metadata for the distributed file system. For example, consistency check module 155 submits a request to the directory service managed by VSAN module 135 to determine nodes that own the physical metadata.

At block 230, using the list of nodes determined to own physical metadata, the controller node transmits a second request to each of the listed nodes. The second request causes each node that owns physical metadata to compare the actual physical metadata with the accumulation of expected physical metadata received from other nodes and/or built by the node. Additionally, each node reports the result of the comparison back to the controller node. For example, each node may transmit a list of inconsistencies or other errors (or lack thereof) based upon the comparison to the controller node. In one embodiment, the report includes inconsistencies or errors that were corrected by the node in response to the comparison.

At block 235, the controller node determines if it has received a report of the comparison from each node. In one embodiment, the controller node uses a threshold period of time to wait for reports and the lack of receipt of a report within the threshold period of time is treated as a failure. If the controller node fails to receive a report from another node, method 200 returns to block 210 to determine nodes that own logical metadata that maps to physical metadata owned by the node that failed to report. For example, if the node that did not send a report has failed, one or more new nodes may assume ownership of the physical metadata by way of a backup copy. At block 215, each node updates the batching of expected physical metadata and transmits updated batches as needed. Method 200 then continues as described above.

Upon receiving a report from each node, at block 240, the controller node aggregates the received reports, along with its own report if generated, and displays or otherwise generates an aggregated report of all inconsistencies and/or repairs made to correct inconsistencies.

FIG. 3 is a flow chart illustrating an exemplary method 300 of a node contributing to a first portion of a distributed file system consistency check. At block 305, the node receives a request from the controller node as described with reference to block 215 of FIG. 2.

At block 310, in response to the request, the node constructs expected physical metadata based upon the logical metadata it owns. For example, consistency check module 155 builds in node memory a bitmap, reference count, and/or physical address space storing data referenced by the logical metadata.

At block 315, the node determines the owner of each portion of actual physical metadata. For example, the physical metadata includes physical addresses of underlying data stored in the distributed file system. Consistency check module 155 submits a request to the directory service managed by VSAN module 135 to determine which nodes that own the physical metadata.

At block 320, using the directory service response, the node batches portions of the expected physical metadata based upon ownership of the actual physical metadata. At block 325, the node transmits each batch of the expected physical metadata to the determined owner of the corresponding actual physical metadata. In one embodiment, the node receives an acknowledgment of receipt of the expected physical metadata from each of the other nodes.

At block 330, the node transmits an indication of success to the controller node. For example, upon receiving acknowledgment of receipt from each of the other nodes, the node transmits the indication of success to the controller node.

FIG. 4 is a flow chart illustrating an exemplary method 400 of a node contributing to a second portion of a distributed file system consistency check. At block 405, the node receives expected physical metadata form one or more other nodes.

At block 410, the node accumulates the received expected physical metadata with any expected physical metadata it constructed for actual physical metadata it owns. In accumulating the expected physical metadata, consistency check module 155 increments or otherwise sums reference counts for each duplicate copy of expected physical metadata. For example, multiple nodes may own logical metadata linked to the same physical metadata. The reference count represents the number of links from logical metadata to the same physical metadata. In one embodiment, accumulating the received expected physical metadata includes generating a bitmap where a bit is set to 1 if its corresponding physical metadata has non-zero reference count. In one embodiment, this bitmap is used to compare against an actual bitmap of the underlying storage owned by the node.

At block 415, the node receives a request to compare the accumulated expected physical metadata with the actual physical metadata owned by the node. At block 420, the node performs the requested comparison. For example, consistency check module 155 compares an expected bitmap with an actual bitmap, expected reference counts with actual reference counts, etc.

At block 425, the node transmits a report of inconsistencies, and any inconsistencies repaired by the node, to the controller node.

It will be apparent from this description that aspects of the inventions may be embodied, at least in part, in software. That is, the computer-implemented methods 200, 300, and 400 may each be carried out in a computer system or other data processing system, such as nodes 105, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105, and, in certain embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document, or portions thereof, may be repeated or performed in parallel with one another or in parallel with different instances of the same or similar methods.

What is claimed is:

1. A computer-implemented method, comprising:
receiving, by a controller node of a plurality of nodes implementing a distributed file system, a request to perform a consistency check of the distributed file system;
transmitting, by the controller node to each of the plurality of nodes other than the controller node, a request for the node to
use logical metadata of the distributed file system owned by the node to construct an expected copy of physical metadata mapped to the logical metadata,
determine which of the plurality of nodes own actual portions of the physical metadata,
transmit corresponding portions of the expected copy of the physical metadata to each of the nodes determined to own actual portions of the physical metadata, and
compare expected copies of the physical metadata received from other nodes to the actual physical metadata owned by the node;
receiving, by the controller node from each of the other nodes, a result of the comparison of the expected copy of the physical metadata to the actual physical metadata;
aggregating, by the controller node, received results to represent a comparison of all portions of the expected copy of the physical metadata to all portions of the actual physical metadata; and
generating, by the controller node, a display reporting any errors represented by the aggregated results.

2. The computer-implemented method of claim 1, further comprising:
determining, by the controller node, each of the plurality of nodes that own logical metadata of the distributed file system.

3. The computer-implemented method of claim 2, wherein determining each of the plurality of nodes that own logical metadata of the distributed file system includes submitting a request to a directory service that tracks owners of the logical metadata.

4. The computer-implemented method of claim 1, further comprising:
receiving, by the controller node from each of the plurality of nodes other than the controller node, an indication that the node has constructed the expected copy of physical metadata from the logical metadata and transmitted corresponding portions of the expected copy of the physical metadata to each of the nodes determined to own actual portions of the physical metadata.

5. The computer-implemented method of claim 4, wherein each node receiving portions of the expected copy of the physical metadata sums reference counts of the expected copy of the physical metadata for each a physical address of the portion of the expected copy of the physical metadata received from a first node matches the physical address of the expected copy of physical metadata constructed by a second node, and wherein the request for each node to compare accumulated expected copies of the physical metadata received from other nodes to the actual physical metadata owned by the node is transmitted to each node in response to the controller node receiving the indication that the node has constructed the expected copy of physical metadata and transmitted the corresponding portions.

6. The computer-implemented method of claim 1, further comprising:
  determining, by the controller node, that an indication of construction of an expected copy of physical metadata has not been received from a first node;
  in response to the determination that the indication has not been received, determining, by the controller node, a second node that now owns logical metadata of the distributed file system that was previously owned by the first node; and
  transmitting, by the controller node to the second node, a request to use the logical metadata that was previously owned by the first node and now owned by the second node to construct the expected copy of physical metadata mapped to the logical metadata.

7. The computer-implemented method of claim 1, wherein each node receiving portions of the expected copy of the physical metadata sums reference counts of the expected copy of the physical metadata for each a physical address of the portion of the expected copy of the physical metadata received from a first node matches the physical address of the expected copy of physical metadata constructed by a second node.

8. A non-transitory computer-readable medium storing instructions, which when executed by a processing device, cause the processing device to perform a method comprising:
  receiving, by a controller node of a plurality of nodes implementing a distributed file system, a request to perform a consistency check of the distributed file system;
  transmitting, by the controller node to each of the plurality of nodes other than the controller node, a request for the node to
    use logical metadata of the distributed file system owned by the node to construct an expected copy of physical metadata mapped to the logical metadata,
    determine which of the plurality of nodes own actual portions of the physical metadata,
    transmit corresponding portions of the expected copy of the physical metadata to each of the nodes determined to own actual portions of the physical metadata, and
    compare expected copies of the physical metadata received from other nodes to the actual physical metadata owned by the node;
  receiving, by the controller node from each of the other nodes, a result of the comparison of the expected copy of the physical metadata to the actual physical metadata;
  aggregating, by the controller node, received results to represent a comparison of all portions of the expected copy of the physical metadata to all portions of the actual physical metadata; and
  generating, by the controller node, a display reporting any errors represented by the aggregated results.

9. The non-transitory computer-readable medium of claim 8, the method further comprising:
  determining, by the controller node, each of the plurality of nodes that own logical metadata of the distributed file system.

10. The non-transitory computer-readable medium of claim 9, wherein determining each of the plurality of nodes that own logical metadata of the distributed file system includes submitting a request to a directory service that tracks owners of the logical metadata.

11. The non-transitory computer-readable medium of claim 8, the method further comprising:
  receiving, by the controller node from each of the plurality of nodes other than the controller node, an indication that the node has constructed the expected copy of physical metadata from the logical metadata and transmitted corresponding portions of the expected copy of the physical metadata to each of the nodes determined to own actual portions of the physical metadata.

12. The non-transitory computer-readable medium of claim 11, wherein each node receiving portions of the expected copy of the physical metadata sums reference counts of the expected copy of the physical metadata for each a physical address of the portion of the expected copy of the physical metadata received from a first node matches the physical address of the expected copy of physical metadata constructed by a second node, and wherein the request for each node to compare accumulated expected copies of the physical metadata received from other nodes to the actual physical metadata owned by the node is transmitted to each node in response to the controller node receiving the indication that the node has constructed the expected copy of physical metadata and transmitted the corresponding portions.

13. The non-transitory computer-readable medium of claim 8, the method further comprising:
  determining, by the controller node, that an indication of construction of an expected copy of physical metadata has not been received from a first node;
  in response to the determination that the indication has not been received, determining, by the controller node, a second node that now owns logical metadata of the distributed file system that was previously owned by the first node; and
  transmitting, by the controller node to the second node, a request to use the logical metadata that was previously owned by the first node and now owned by the second node to construct the expected copy of physical metadata mapped to the logical metadata.

14. The non-transitory computer-readable medium of claim 8, wherein each node receiving portions of the expected copy of the physical metadata sums reference counts of the expected copy of the physical metadata for each a physical address of the portion of the expected copy of the physical metadata received from a first node matches the physical address of the expected copy of physical metadata constructed by a second node.

15. An controller node comprising:
  a processing device; and
  a memory coupled to the processing device, the memory storing instructions which, when executed by the processing device, cause the controller node to:
    receive a request to perform a consistency check of a distributed file system;
    transmitting, to each of a plurality of nodes other than the controller node implementing the distributed file system, a request for the node to use logical metadata of the distributed file system owned by the node to construct an expected copy of physical metadata mapped to the logical metadata, determine which of the plurality of nodes own actual portions of the physical metadata, transmit corresponding portions of the expected copy of the physical metadata to each of the nodes determined to own actual portions of the physical metadata, and compare expected copies of the physical metadata received from other nodes to the actual physical metadata owned by the node;

receive, from each of the other nodes, a result of the comparison of the expected copy of the physical metadata to the actual physical metadata;

aggregate received results to represent a comparison of all portions of the expected copy of the physical metadata to all portions of the actual physical metadata; and generate a display reporting any errors represented by the aggregated results.

16. The controller node of claim 15, wherein the instructions further cause the controller node to:

determine each of the plurality of nodes that own logical metadata of the distributed file system.

17. The controller node of claim 16, wherein determining each of the plurality of nodes that own logical metadata of the distributed file system includes submitting a request to a directory service that tracks owners of the logical metadata.

18. The controller node of claim 15, wherein the instructions further cause the controller node to:

receive, from each of the plurality of nodes other than the controller node, an indication that the node has constructed the expected copy of physical metadata mapped to the logical metadata and transmitted corresponding portions of the expected copy of the physical metadata to each of the nodes determined to own actual portions of the physical metadata.

19. The controller node of claim 18, wherein each node receiving portions of the expected copy of the physical metadata sums reference counts of the expected copy of the physical metadata for each a physical address of the portion of the expected copy of the physical metadata received from a first node matches the physical address of the expected copy of physical metadata constructed by a second node, and wherein the request for each node to compare accumulated expected copies of the physical metadata received from other nodes to the actual physical metadata owned by the node is transmitted to each node in response to the controller node receiving the indication that the node has constructed the expected copy of physical metadata and transmitted the corresponding portions.

20. The controller node of claim 15, wherein the instructions further cause the controller node to:

determine that an indication of construction of an expected copy of physical metadata has not been received from a first node;

in response to the determination that the indication has not been received, determine a second node that now owns logical metadata of the distributed file system that was previously owned by the first node; and transmit, to the second node, a request to use the logical metadata that was previously owned by the first node and now owned by the second node to construct the expected copy of physical metadata mapped to the logical metadata.

* * * * *